(12) United States Patent
Ecklein

(10) Patent No.: US 8,403,095 B1
(45) Date of Patent: Mar. 26, 2013

(54) STEP ON-STEP OFF MOTORIZED UTILITY VEHICLE

(76) Inventor: Bryce A. Ecklein, Blenheim (NZ)

( * ) Notice: Subject to any disclaimer, the term of this patent is extended or adjusted under 35 U.S.C. 154(b) by 0 days.

(21) Appl. No.: 13/373,868

(22) Filed: Dec. 5, 2011

(51) Int. Cl.
*B60K 28/04* (2006.01)

(52) U.S. Cl. ........................................ 180/290; 180/908

(58) Field of Classification Search ............... 180/21, 180/7.1, 282, 287, 290, 908; 280/87.043
See application file for complete search history.

(56) References Cited

U.S. PATENT DOCUMENTS

| | | | |
|---|---|---|---|
| 2,280,157 A | 4/1942 | Mead | |
| 3,840,085 A | 10/1974 | Smith | |
| 4,522,281 A * | 6/1985 | Snider | 180/208 |
| 4,874,055 A | 10/1989 | Beer | |
| 6,105,706 A * | 8/2000 | Cooper | 180/282 |
| 6,336,600 B1 * | 1/2002 | Jessen | 239/663 |
| 6,397,961 B1 * | 6/2002 | Sutton | 180/65.1 |
| 6,543,564 B1 * | 4/2003 | Kamen et al. | 180/89.13 |
| 6,889,784 B2 | 5/2005 | Troll | |
| 7,363,993 B2 * | 4/2008 | Ishii | 180/7.1 |
| 7,789,174 B2 * | 9/2010 | Kamen et al. | 180/7.1 |
| 7,798,264 B2 * | 9/2010 | Hutcheson et al. | 180/65.1 |
| 7,900,725 B2 * | 3/2011 | Heinzmann et al. | 180/65.1 |
| 8,016,060 B2 * | 9/2011 | Miki et al. | 180/65.1 |
| 8,028,777 B2 * | 10/2011 | Kakinuma et al. | 180/65.1 |
| 8,160,794 B2 * | 4/2012 | Fuwa | 701/70 |
| 8,186,700 B2 * | 5/2012 | Li et al. | 280/250.1 |
| 8,226,092 B2 * | 7/2012 | Oliver | 280/47.18 |
| 2005/0045398 A1 * | 3/2005 | Suzuki | 180/209 |
| 2005/0173180 A1 * | 8/2005 | Hypes et al. | 180/292 |
| 2006/0042844 A1 * | 3/2006 | Kirkpatrick et al. | 180/65.2 |
| 2006/0249313 A1 * | 11/2006 | Kamen et al. | 180/7.1 |
| 2010/0126787 A1 * | 5/2010 | Kawada | 180/21 |
| 2011/0213522 A1 * | 9/2011 | Stevens et al. | 701/22 |

FOREIGN PATENT DOCUMENTS

JP         5208057         8/1993

* cited by examiner

*Primary Examiner* — Katy M Ebner
*Assistant Examiner* — Emma K Frick

(57) ABSTRACT

A new type of motorized, four wheeled, utility vehicle that provides for the driver to operate the vehicle from a standing position on a rear platform facilitating step on-step off movements and incorporating an automatic braking mechanism and adjustable weight distribution mechanism for enhanced safety. The vehicle further includes a fully suspended chassis, automatic transmission, forward, reverse and neutral gearing, oversized tires and total payload in excess of 400 pounds making it suitable for a wide variety of work activities and terrain conditions.

10 Claims, 2 Drawing Sheets

STEP ON-STEP OFF MOTORIZED UTILITY VEHICLE

CROSS REFERENCE TO OTHER APPLICATIONS

Not Applicable

FEDERALLY SPONSORED RESEARCH

Not Applicable

SEQUENCE LISTING

Not Applicable

BACKGROUND

Prior Art

1. Stated Need

Figure 1:
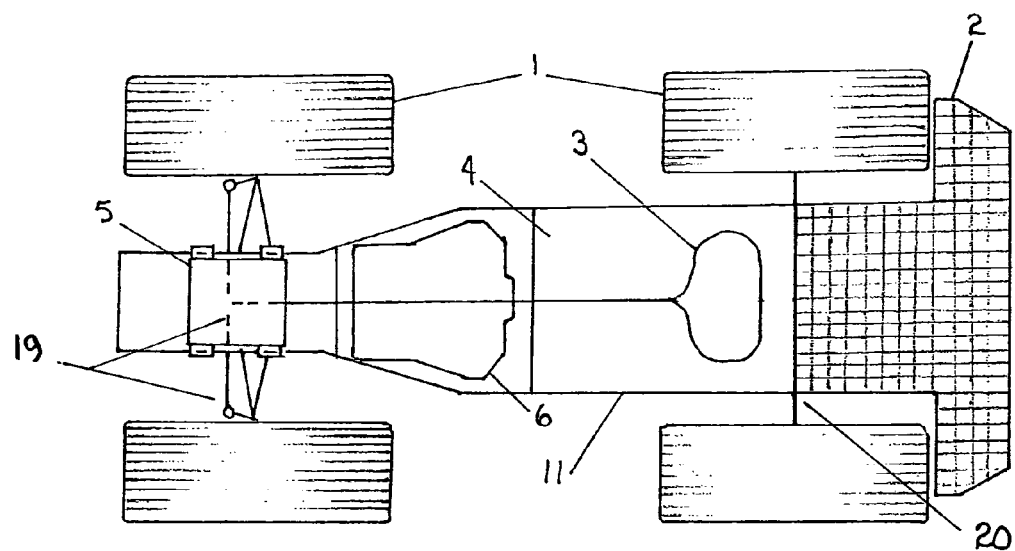

The need exists for a utility vehicle that can be used in a working environment (usually outdoors) to transport both operator and equipment (tools, parts, etc.) in a manner which allows operator to traverse to a series of potentially random and unpredictable work sites and commence work by merely stepping on and off the vehicle (e.g. cruising irrigation lines for leaks or scanning an orchard for diseased fruit). The generic class of All Terrain Vehicles (ATV's) and 'Mule' type vehicles require the operator to assume a seated position prior to operating the vehicle and then, upon arriving at the work site, depart the vehicle by standing up and exiting prior to beginning whatever task was at hand. The operator in such vehicles can become subject to the phenomenon known as 'anticipatory fatigue' where, in this case, the prospect of effort needed to get out of the vehicle mentally outweighs the need to stop and deal with a potential work effort. Also, in such latter referenced vehicles, the operator is always at risk of being trapped in the event of a roll-over accident. In any case, the time savings in accessing potential work sites throughout the day using a step-on/step-off type vehicle over one which requires the operator to enter or mount and exit and dismount the vehicle is noteworthy (approximately 1:1.2 in favour of the step-on/step-off vehicle).

Because the operator of a step-on/step-off vehicle is positioned behind the rear axel, there exists the potential that the weight of the operator could exceed the weight over the front axel, causing imbalance and reduced ability to turn. This condition is addressed by placing all fixed elements (e.g. engine, battery, tool boxes, etc.) as far forward as possible. The same applies to expendable elements (fuel, parts, etc.) so that with combination of the two weight components (fixed and expendable), the static load point is just aft the front axel. This is in deference to ATV's and 'mules' where the load point is at the center of the vehicle or just forward of the rear axel. Either of the latter mentioned vehicles would not have a positive front end downward force with an operator standing behind the rear axel. To further compensate for variability in operator weight and terrain grade, a movable and remotely controlled weight tray is incorporated to advance the static load point forward as necessary.

As an added safety feature and to assure that the vehicle remains motionless when the operator is not on the operator's platform, a pressure sensitive automatic brake is incorporated in to the vehicle. The brake is released when the operator's weight is detected on the platform.

2. Prior Art

No commercially available and viable vehicle has been developed to meet the above stated need or safety issues. While several stand-up operated vehicles exist, they either require the operator to be inside (the classic old milk truck) or have no ability to either operate outdoors on uneven terrain with a significant payload or to adjust loading dynamics to meet operator and terrain conditions.

Relevant prior art includes U.S. Pat. Nos. 2,280,157; 3,840,085; 4,874,055, 6,336,600 and 6,889,784 and Japanese Patent # JP 5208057. A brief review and critique in order:

1)—#2,280,157—This is the classic 'milk truck' patent that served well during its time but falls short in terms of utility relative to tasks that need to be performed in a wide variety of terrain conditions and work environments. The reality that the driver/operator is inside the vehicle, exposes that individual to the prospect of roll-over and being trapped inside or crushed by the vehicle. Also, while the reference patent does regroup some vehicle controls to support a standing driver, the extent of the regrouping and the technology involved are limited and are surpassed by the current invention.

2)—#3,840,085—This is a basic 'chariot' type invention that does, however, incorporate a stand-up driver. It has no limited utility, no commercial viability and merits no further discussion.

3)—#4,874,055—The stated purpose of this invention is to be a golf cart. It is a 3 wheeler and, as such, has an inherent instability (Note: ATV manufacturers have all but abandoned production and sales of 3 wheel vehicles due to the safety issue). Further, the design has a limited payload prospect and limited terrain capability due to the lack of suspension.

4)—6,889,784—This is another basic 'chariot' type invention that does have a stand-up driver position. It is a 3 wheeler and suffers the same safety prospects as other 3 wheeled vehicles. It is presented without suspension, a deficiency that greatly limits its capabilities for payload and terrain response.

5)—#6,336,600—This is a brilliantly conceived fertilizer spreader and features a stand-up operator position as an option. While its design may serve its intended purpose, it is limited in its ability to be a more general purpose utility vehicle. Specifically, it has no suspension system that would allow it to accommodate terrain or payload variances; it depends on an articulated joint from the main unit to the driver's unit (Note: it is unclear that the joint between these components can actually work as described in drawings and as patented due to the fixed nature of one joint) and, thus, is vulnerable to jack-knife in certain turning/terrain conditions; it places all the vehicle load (i.e. engine, transmission, battery, alternator, fuel, payload, frame, controls, etc.) and a portion of the driver's weight (when onboard) over or in front of the front axle resulting in an unacceptable steering friction and, lastly, this vehicle was not intended for repeated and spontaneous 'on-off' driver movements as evidenced by the lack of any auto-brake and the need to lock the steering handle in position for each operating mode.

6)—#JP 5208057—The stated purpose of this vehicle is as a golf cart. While it benefits from a four wheel configuration and rear driver standing position, it lacks a suspension system, has low ground clearance, offers no dynamic weight adjustment or automatic braking system and, due to its short wheel base, small wheels and overall configuration, is not in the class with the presented step on-step off utility vehicle.

Advantages

The current invention advances and broadens the capabilities of step on-step off vehicles through introduction of enhanced handling and payload attributes and increased built-in safety aspects. Specifically, by introducing a robust suspension system and tire size/type on a four wheel chassis, the vehicle can respond to a wide variety of payload and terrain conditions. By incorporating an on-demand and/or automatic weight distribution mechanism, the vehicle can be set up to maintain an optimal balance condition to respond to varying terrain. Additionally, the auto-stop braking feature assures that the vehicle stays motionless while the driver is not in position.

SUMMARY

According to a first aspect of the invention, there is provided a vehicle comprising a chassis having a frame with at least four wheels rotatably mounted thereon, a platform which extends rearwardly from the frame, an engine, and a control means adapted for controlling the steering and speed of the vehicle, the control means being arranged to be operated by a driver standing on the platform, wherein the platform is configured to allow a person to step onto the platform from outside the vehicle and step off the platform to leave the vehicle.

The vehicle may have a counterweight device arranged to increase the stability of the vehicle. The weight of the counterweight device may be adjustable. The counterweight device may include one or more compartments for containing one or more weights.

The counterweight device may be configured so as to be movable, wherein the movement of the counterweight device increases the stability of the vehicle. Advantageously, the counterweight device is moveable by means of a motor and controlled by a control unit.

The platform may contain a pressure sensor arranged to detect whether a person is standing on the platform and, if no person is detected, activate a braking mechanism to prevent the vehicle from moving.

In one embodiment, the vehicle has four wheels. The vehicle may be two-wheel drive or four-wheel drive.

DRAWINGS LIST

Figure 2:
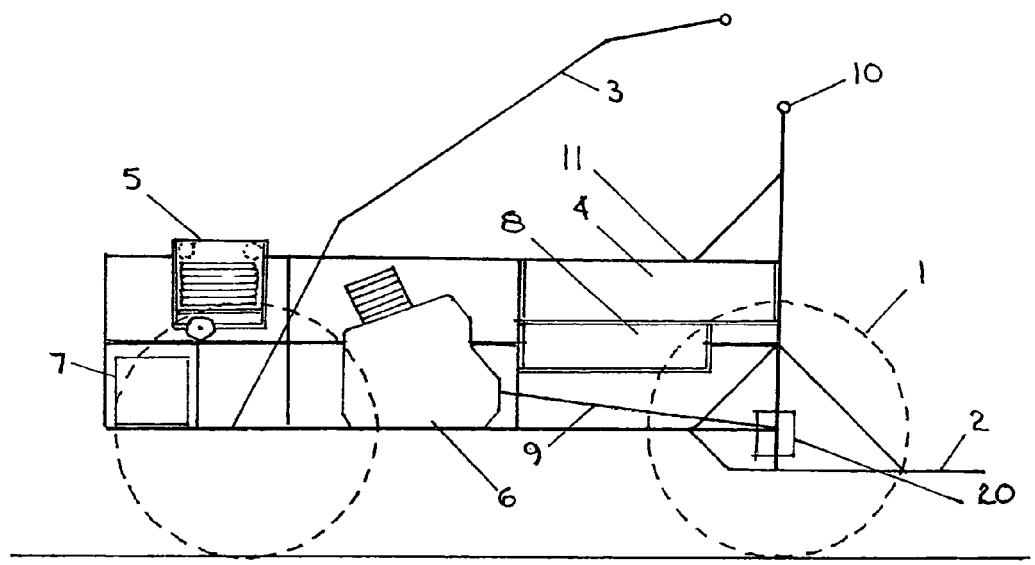
Figure 3:
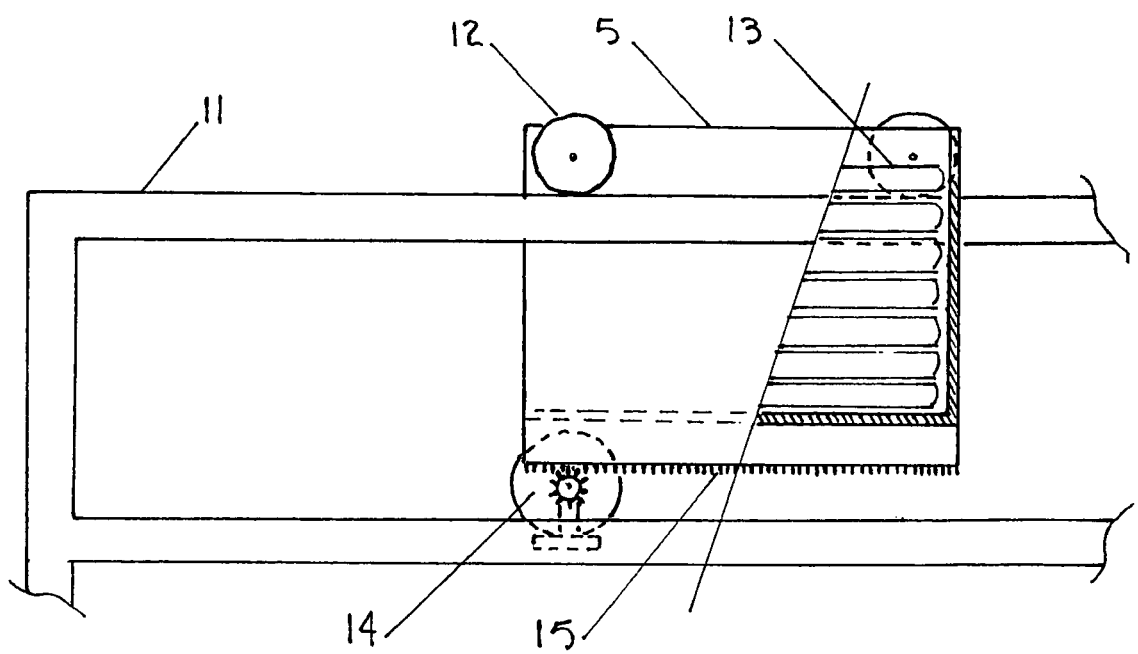
Figure 4:
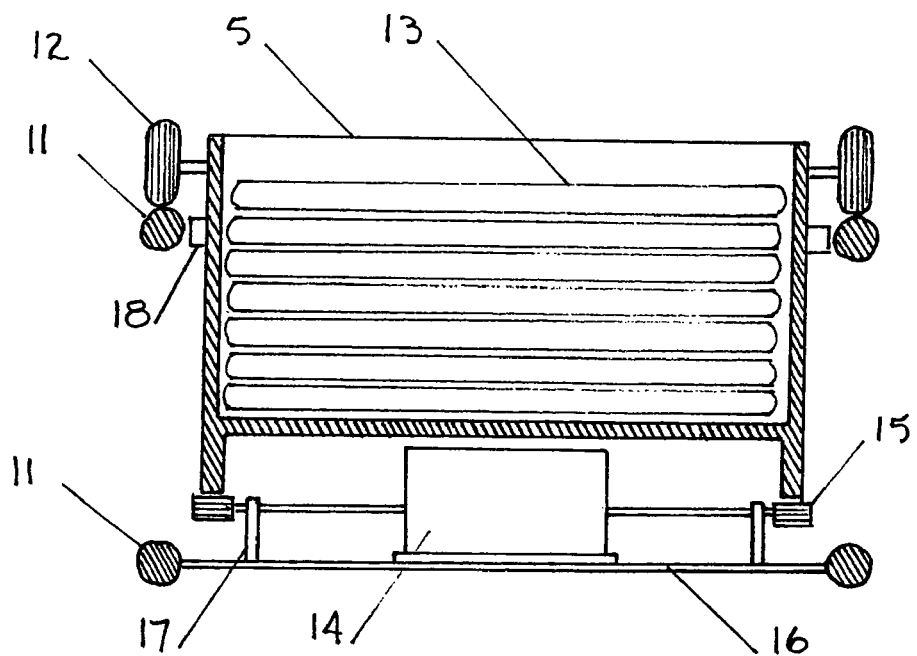

FIG. 1—plan view of a vehicle according to the invention.
FIG. 2—cross-sectional side view of the vehicle.
FIG. 3—partially cut-away side view of the counterweight device within the vehicle.
FIG. 4—end-on cross-sectional view of the counterweight device.

REFERENCE NUMERALS

1—wheels
2—operator's stand-on platform
3—steering arm
4—parts and tool tray
5—movable weight tray
6—engine
7—battery
8—fuel tank
9—drive shaft (rear drive version)
10—grab rail
11—mainframe (typical)
12—movable weight tray roller wheels
13—slab weights
14—dc reversible motor
15—cogged tray drive
16—motor support
17—motor shaft support
18—alignment rollers
19—front wheel steering mechanism
20—pressure sensitive auto brake

DETAILED DESCRIPTION

A preferred embodiment of the utility vehicle will now be described, by way of example only, with reference to the accompanying drawings in which:
FIG. 1 is a plan view of a vehicle according to the invention.
FIG. 2 is a cross-sectional side view of the vehicle.
FIG. 3 is a partially cut-away side view of the counterweight device within the vehicle.
FIG. 4 is an end-on cross-sectional view of the counterweight device.

The vehicle is a general purpose, motorised utility vehicle that allows the driver to step onto a platform at the rear of the vehicle to operate the vehicle from a standing position, and then step off the platform to dismount. The vehicle is suitable for use in a variety of conditions including vineyards, orchards, paddocks, construction sites, and event venues. The vehicle is particularly suited for use in situations in which multiple stops are required and where the driver needs to leave the vehicle at each stop. Use as a delivery vehicle is therefore also possible.

As shown in FIGS. 1 and 2, the vehicle comprises a chassis having a frame 11 with at least four wheels 1 rotatably mounted thereon, a platform 2 which extends rearwardly from the frame, an engine 6, and a control means adapted for controlling the steering and speed of the vehicle, the control means being arranged to be operated by a driver standing on the platform, wherein the platform is configured to allow a person to step onto the platform from outside the vehicle and step off the platform to leave the vehicle.

The vehicle has at least four wheels 1 in order to increase the stability of the vehicle on undulating terrain compared with a two or three wheeled vehicle. The incorporation of a suspension system and large, soft tires allows the vehicle to operate comfortably over uneven terrain. The vehicle of the preferred embodiment has four wheels and is rear wheel drive with a drive shaft 9 extending from the engine to rotate an axle between the two laterally opposed rear wheels. However, the vehicle could be front wheel drive or four wheel drive. In the preferred embodiment the front tyres of the vehicle are 22×8R10 and the rear tires are 22×11.00R8. The front tires are each approximately half filled with water. The vehicle can be fitted with fenders.

The vehicle has independent front suspension and can have independent rear suspension (suspension not shown). A fuel tank 8 supplies the engine with petrol or diesel. The vehicle has sufficient power to carry both the driver and a payload (tools, parts, etc.) of up to approximately 400 pounds. The vehicle can be configured with a tool box, parts bin, carrying rack, etc. In the preferred embodiment, the vehicle is configured with a tool and/or parts tray 4.

The driver stands on the platform 2 in the rearward portion of the vehicle to operate the control means and drive the vehicle. The platform is set off the ground and provides the driver with an unobstructed view of the vehicle and its surroundings. In the preferred embodiment, the platform is 7.5 inches off the ground. The platform contains a pressure sensor (not shown) arranged to detect whether a person is standing on the platform and, if no person is detected, activate a braking mechanism to prevent the vehicle from moving. With the driver's weight on the platform, the pressure sensitive automatic brake 20 of any common type well known in the art is released and the vehicle can be driven.

The height of the platform from the ground makes the vehicle suitable for use in crowd control at an event venue, such as an outdoor concert, as well as supervising work crews spread out over a distance, for example in an orchard. The absence of a cab provides the driver with unobstructed views of the vehicle and its surroundings, and prevents the driver from being trapped inside the vehicle in the event that the vehicle rolls over.

The control means consists of a steering arm 3 connected to a front wheel steering mechanism (may include Pitman type arm) 19 which extends across the width of the vehicle between the steerable wheels of the vehicle, which in the preferred embodiment are the front wheels. A throttle is mounted onto the steering arm. The vehicle has power-assisted steering and can be placed in neutral, forward or reverse but does not require a clutch. When in neutral, the vehicle is stationary and allows the driver to step off the platform to leave the vehicle and then step back onto the platform to recommence driving. However, the vehicle does not have to be placed in neutral to become motionless. The vehicle has a centrifugal clutch that essentially goes into neutral at low revolutions. The vehicle can be placed in neutral as when starting or revving the engine 6 to check tuning, etc. The vehicle has an ignition switch, gear shift, hand brakes and a parking brake. A grab rail 10 is present for the driver to hold on to for stability.

Because the driver of the vehicle is positioned behind the rear axle in the rearward portion of the vehicle, there exists the potential that the weight of the driver could exceed the weight in the forward portion of the vehicle in front of the front axle, causing imbalance and reduced ability to turn. This situation can be addressed by placing all fixed elements (e.g. engine 6, battery 7, tool boxes 4, etc.) as far forward as possible. The same applies to expendable elements (fuel, parts, etc.) so that with the combination of the two weight components (fixed and expendable), the static load point is just in front of the front axle. This is in contrast to All Terrain Vehicles (ATV's) and 'Mule' type vehicles where the load point is at the centre of the vehicle or just forward of the rear axle. Either of the latter mentioned vehicles would not have a positive front end downward force with a driver standing behind the rear axle.

In order to further improve the stability of the vehicle, the vehicle contains a counterweight device arranged to increase the stability of the vehicle and counterbalance the weight of the driver standing on the platform. The counterweight device comprises a tray 5 which can hold a number of removable weights 13 in compartments within the tray. The exact number and size of the weights in the tray can be adjusted by the driver depending upon the relative difference in weight between the forward and rearward portions of the vehicle.

The counterweight device is moveable within a cavity inside the forward portion of the vehicle so as to shift the centre of gravity of the vehicle, for example, in response to a change in the gradient of the terrain being travelled so as to prevent the vehicle from tipping over. Mounted onto the external walls of the tray 5 are four ball bearing wheels 12 (only two are shown) that are arranged to roll along the internal frame members 11 of the vehicle within the cavity. The tray also has alignment rollers 18 to engage with the internal frame members. The tray can be driven in either longitudinal direction within the cavity by means of a rack and pinion arrangement. On the underside of the tray is a pair of spaced apart cogged racks 15 that cooperate with a corresponding pair of toothed pinions, each pinion being mounted to either end of an axle that is rotated by a reversible motor 14.

The motor is fixed to a support 16 at the base of the cavity and the rotating axle is supported at either end by a support shaft 17. The motor is a standard 12V D.C. reversible motor and is powered by a battery 7 in the vehicle. The motor is controllable by remote control and can be controlled by a microprocessor programmed to move the tray a particular distance in response to a change in the gradient of the terrain as detected by a sensor. The motor 14 can also be controlled manually by means of a lever operated by the driver.

While some preferred aspects of the invention have been described by way of example, it should be appreciated that modifications and/or improvements can occur without departing from the scope of the invention as set out in this specification.

The terms comprise, comprises, comprising, or comprised, if and when used herein, should be interpreted non-exclusively, that is, as conveying "consisting of or including".

Operation

The operator of the vehicle steps onto a platform mounted aft of the rear axel, gaining access to the steering arm and various controls necessary for vehicle operation. The controls include the throttle, hand brake, ignition switch, gear shift and weight compensation lever. With the operator's weight on the platform, the pressure sensitive auto brake is released and the vehicle can be placed in motion. The operator, in standing position, guides the vehicle to its next destination or work location, where the operator can just step off the vehicle (thus activating the auto brake) and perform whatever task is necessary and then step back onto the vehicle and proceed onward. Advantages to the operator include:
1) step on-step off operation—removing the need to 'enter' the vehicle;
2) elevated surveillance height from operating position;
3) weight compensation adjustment to optimize control and safety;
4) increased safety due to low prospect of being pinned under vehicle in a roll-over accident.
5) automatic stopping of vehicle when operator not on platform.

Conclusion

The Step On-Step Off vehicle offers a new approach to utility vehicle design and capabilities. With the ability to transport the operator in a variety of work conditions with a usable payload over variable terrain while providing the operator the convenience and safety of being able to step off the vehicle when necessary, a new dimension has been added to utility vehicle design. The core attribute is the ease of work that can be accomplished through a vehicle design that provides the operator an optimal elevated view of the work environment coupled with the convenience of being able to approach a work station (site) and simply step off the vehicle and tend to the task at hand. Operator safety is enhanced due to the low risk of rollover and the incorporation of an automatic brake and an adjustable load compensation mechanism. Clearly, subtle design variations and reconfigurations are in the offing that may further enhance the advantages of the design presented while still respecting the underlying concept.

The invention claimed is:

1. A utility vehicle comprising:
   (a) a mainframe with a wheelbase, said wheelbase including two front wheels and two rear wheels;
   (b) an engine incorporating a transmission for propulsion;

(c) a front wheel steering mechanism led to rear of the vehicle;

(d) an aft mounted operator's stand-on platform, wherein said stand-on platform is positioned at a rearward-most portion of the vehicle, configured such that an operator may step onto the platform from the rear to access the steering mechanism and operate the vehicle while standing;

(e) a means for moving and distributing weight including an adjustable weight tray, wherein said adjustable weight tray moves longitudinally in a forward-rearward direction relative to the wheelbase, said movement of the weight tray is facilitated by weight tray rollers and a cogged tray drive;

(f) a means for automatically stopping vehicle when operator not on board; and (g) a tray for tools and parts.

2. The utility vehicle of claim 1 wherein said engine for propulsion includes any device capable of producing sufficient power.

3. The engine for propulsion in claim 2 where sufficient power is generated to propel said vehicle with a payload up to 400 pounds.

4. The engine for propulsion of claim 3 is linked to the transmission allowing operation in forward, neutral and reverse.

5. The utility vehicle of claim 1 wherein said front wheel steering mechanism allows the vehicle to be driven safely from the rear platform.

6. The utility vehicle in claim 1 wherein said means for distributing weight is capable of being adjusted prior to operation and moved during operation.

7. The means for distributing weight in claim 6 wherein said weight is altered remotely by operator.

8. The means for automatically stopping the vehicle in claim 1 wherein the stopping function is sensed by a pressure sensitive unit responding to operator weight.

9. The utility vehicle in claim 1 where said chassis has a front suspension and a rear suspension.

10. The utility vehicle in claim 1 where said wheels are large, soft 22×8R10 front and 22×11.00R8 rear tyres.

* * * * *